No. 706,283. Patented Aug. 5, 1902.
A. VOELKER.
ELECTRIC GLASS FURNACE.
(Application filed Apr. 25, 1901.)

(No Model.) 2 Sheets—Sheet 1.

Witnesses:
O. F. Sonnek
E. J. Oakes

Inventor
August Voelker,
By Knight Bros.
Attys

No. 706,283. Patented Aug. 5, 1902.
A. VOELKER.
ELECTRIC GLASS FURNACE.
(Application filed Apr. 25, 1901.)

(No Model.) 2 Sheets—Sheet 2.

Witnesses:

Inventor,
August Voelker,

United States Patent Office.

AUGUST VOELKER, OF COLOGNE, GERMANY, ASSIGNOR TO COMPANY L'INDUSTRIE VERRIÈRES ET SES DERIVÉS, OF BRUSSELS, BELGIUM.

ELECTRIC GLASS-FURNACE.

SPECIFICATION forming part of Letters Patent No. 706,283, dated August 5, 1902.

Application filed April 25, 1901. Serial No. 57,499. (No model.)

*To all whom it may concern:*

Be it known that I, AUGUST VOELKER, a subject of the King of Prussia, German Emperor, residing at Cologne-on-the-Rhine, in the Kingdom of Prussia and German Empire, have invented certain new and useful Improvements in Electrical Glass-Furnaces, of which the following is a specification.

This invention relates to an electrical furnace for melting glass and producing waterglass, characterized by inclined radiating passages in which melting is effected by the heat of electric arcs produced by electrodes arranged in them, these passages leading to a common refining-receptacle, in which the material is heated by the heat resulting from electrical resistance.

Figure 1:
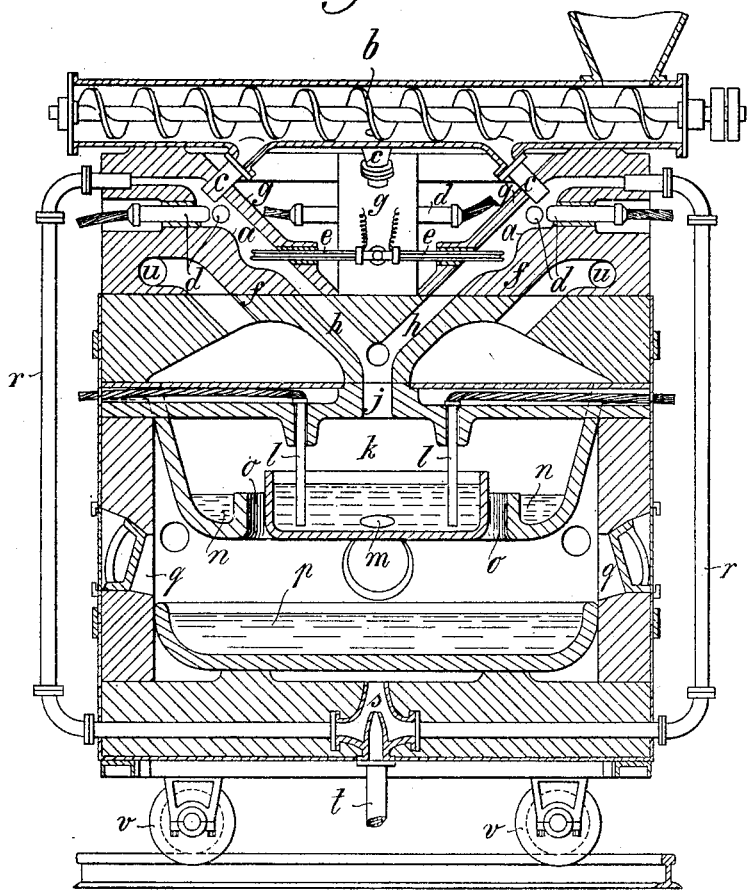
Figure 2:
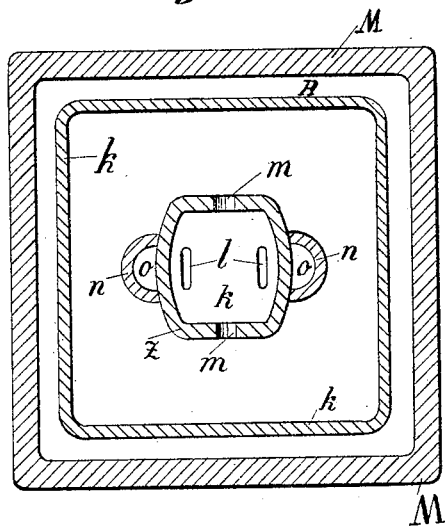
Figure 3:
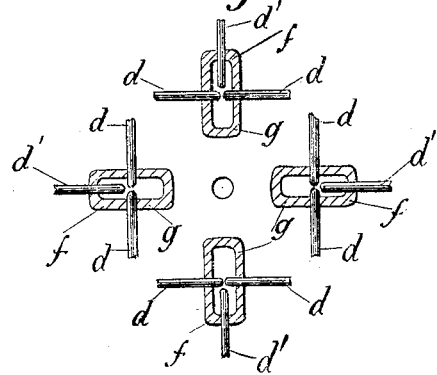

In the accompanying drawings, Figure 1 is a vertical section of a furnace according to my invention. Fig. 2 is a horizontal section of the furnace through the annular space $o$, and Fig. 3 is a horizontal section through the electrodes $d$.

The materials for forming the glass are fed by a worm-conveyer $b$ to four tubes $c$, which lead into inclined radial passages over what may be termed the "hearth" $a$. The materials are melted by the heat of arcs produced by electrodes $d$, arranged in each passage, and also by arcs of electric candles $e$ of the Jablochkoff kind. The passages are formed in four refractory blocks $f$ and are covered by slabs $g$. The molten materials flow down the inclined channels $h$, which meet in a central channel $j$, and thence they flow into the refining-pot $k$, in which when fine glass is to be produced refining is effected by the heat caused by resistance between two electrodes $l$, which can be led in by earthenware pipes and supplied with continuous or alternating electric currents. From $k$ the fluid glass flows by openings $m$ into the annular trough $n$ and thence, overflowing, descends by passages $o$ into the basin $p$, from which it is worked by tools through the working doors $q$, or the basin may be so arranged that it can be emptied by tipping. The combustible gases evolved in the passages, which cannot descend because the outlet $j$ is closed by the molten material, are conducted by pipes $r$ to a burner $s$, where they meet with air entering by a pipe $t$. The flame from this burner serves to maintain the heat of the working-out basin $p$ and its contents. Such incombustible gases as are evolved pass away by channels $u$.

The furnace is preferably mounted on wheels $v$, so that it can be readily moved from place to place, and its outer walls are inclosed in metal casing.

What I claim, and desire to secure by Letters Patent of the United States, is—

1. In a furnace for melting glass, the combination with a plurality of inclined passages converging to form a common outlet, an inlet for each of said passages, electrodes to form an arc immediately at the inlet to each of said passages, electrodes positioned in the respective passages below the first-named electrodes, a refining-pot located immediately below the common outlet of the said passages and electrodes positioned in said pot.

2. In a furnace for melting glass, the combination with a plurality of inclined passages converging to form a common outlet, electrodes in said passages, an inlet for each of said passages, a refining-pot below said outlet and a basin below the refining-pot, of outlets forming a continuation of the respective passages above the said inlets for the escape of combustible gases produced in said passages and pipes leading from said outlets to a suitable burner below the basin whereby said basin is heated by said gases.

In testimony whereof I have hereunto set my hand in the presence of two witnesses.

AUGUST VOELKER.

Witnesses:
 KARL SCHMITT,
 JOH. SCHOLZ.